Feb. 4, 1936.  E. C. HORTON  2,030,003
FLUID MOTOR
Filed June 15, 1933
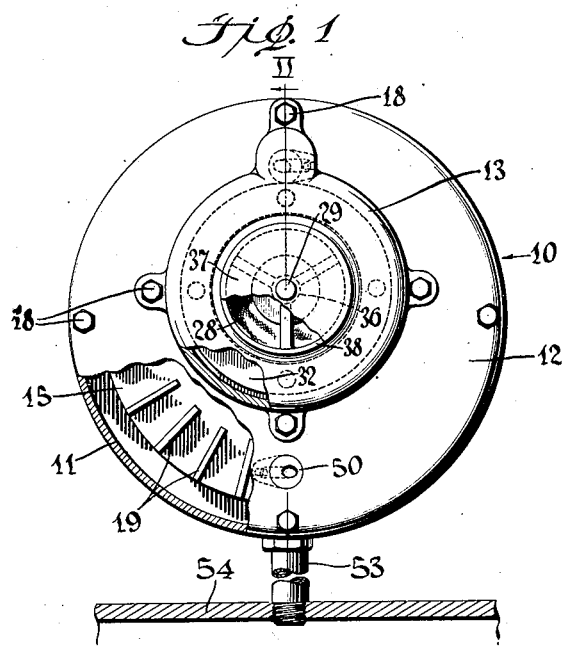
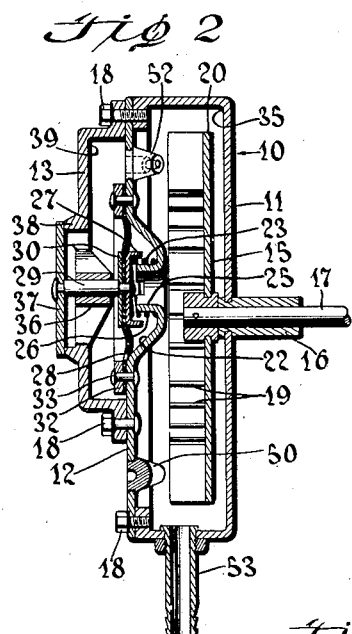
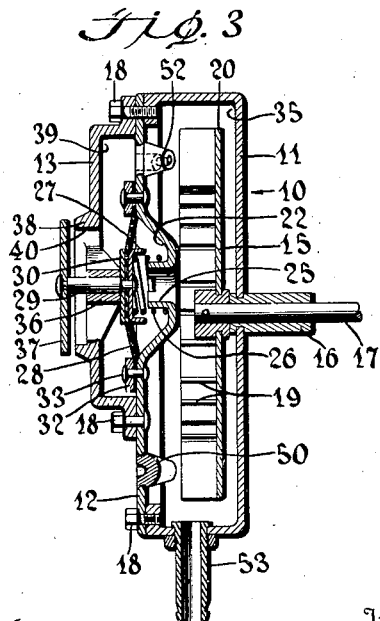
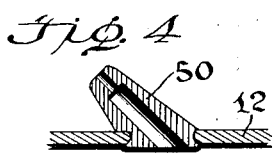
Inventor
Erwin C. Horton,
Beau & Brooks Attorneys Patented Feb. 4, 1936

2,030,003

UNITED STATES PATENT OFFICE 2,030,003

FLUID MOTOR

Erwin C. Horton, Hamburg, N. Y., assignor to Trico Products Corporation, Buffalo, N. Y.

Application June 15, 1933, Serial No. 676,006

3 Claims. (Cl. 253—50)

This invention relates to fluid motors and it has particular relation to the turbine type of fluid motor operated by means of fluid in jet form directed thereon.

One object of the invention is to provide an automatically regulated fluid motor that provides substantially uniform motor speed regardless of changes in intensity of the motive power.

Another object of the invention is to provide a fluid motor which is responsive to changes in differential fluid pressure to regulate automatically the speed of the motor.

Another object of the invention is to provide a fluid motor in which actuating fluid is applied successively from different points as the intensity of fluid pressure differential varies within predetermined limits.

In the drawing:

Fig. 1 is a front elevation of a fluid motor;

Fig. 2 is a cross section taken substantially along the line II—II of Fig. 1, and illustrating the normal position of the operating parts of the motor.

Fig. 3 is a cross section similar to Fig. 2 and illustrating the parts of the motor in a position they assume under abnormal operating conditions; and Fig. 4 is a fragmentary cross section of a nozzle for directing a jet of fluid to operate the motor.

The invention is embodied in a fluid motor 10 of the turbine type which comprises casing sections 11, 12 and 13 and a rotor 15 having a bearing support 16 for its shaft 17 in the wall of the section 11. The casing sections are assembled in fluid tight relation by means of suitable fastening devices 18. Blades 19 of the rotor extend integrally at right angles from one side of a rotor disk 20 and are arranged in a circumferential row adjacent the outer circumferential face portion of the disk. The rotor shaft 17 is adapted to drive various elements, such as fans, windshield cleaners, motors, or other devices employed in conjunction with internal combustion engines and the like.

An intermediate portion of the casing section 12 is cupped or bent to form an annular recess 22, the bottom or central portion of which is provided with a relatively narrow annular flange 23 defining an opening 25. A coiled spring 26 has one of its ends anchored about the flange 23 and its other end disposed in a cup or socket 27 that is secured against one side of a diaphragm 28 by means of a valve stem 29 extending through the cup and diaphragm and through a washer 30 opposed to the cup on the opposite side of the diaphragm. The outer edges of the diaphragm are clamped in fluid tight relation against the surface of the casing section 12 around the borders on the recess 22 by means of a ring 32 having suitable fastening devices 33. Thus the casing sections 11 and 12 provide a chamber 35 for receiving the rotor, and the diaphragm is subject to the fluid pressure conditions in the chamber by reason of the direct fluid communication through the opening 25 to one side of the diaphragm.

The valve stem 29 is slidably mounted in a spider bearing 36 and its outer end carries a valve 37 normally seated upon an annular seat 38. This valve provides communication with the atmosphere from a chamber 39 formed by the casing sections 12 and 13 and diaphragm 28. Movement of the diaphragm 28 under the influence of fluid pressure differential determines the operation of the valve. The seat 38 defines an opening 40 leading into the chamber 39 and normally closed by the valve.

A primary nozzle 50 mounted in the casing section 12 communicates with the atmosphere and is directed against or toward the blades 19 of the rotor. A secondary nozzle 52 mounted in the same casing section 12 provides communication between the chambers 39 and 35. A fluid conveying connection 53 is connected in the wall of the casing section 11 and it is adapted to be in communication with a suitable fluid exhausting apparatus, such as the intake manifold 54 of the internal combustion engine of the vehicle.

It is to be observed that the internal diameter of the connection 53 is considerably larger than the combined internal diameters of the nozzles 50 and 52, or larger than twice the diameter of either of them.

The diaphragm 28 is responsive to the low pressure in the intake manifold. Herein, the diaphragm is indirectly responsive to such low pressure through the rotor chamber 35.

In operating the motor 10, fluid is exhausted from the chamber 35 through the conduit connection 53 and fluid under the influence of atmospheric pressure is forced through the nozzle 50 in the form of jet that impinges upon the blades 19 of the rotor to rotate the latter. Under normal operating conditions the fluid is exhausted from the chamber 35 at such rate that the fluid pressure differential maintains the valve 37 closed against the compression of the spring 26. Since the internal diameter of the fluid connection 53 is greater than the combined diameters of the nozzles 50 and 52, it is apparent that the pressure inside the chamber 35 is considerably reduced during the normal operation of the motor, that is, the diaphragm 37 is subjected to a relatively high fluid pressure differential. In the event the suction for exhausting fluid from the chamber 35 is lessened, for example, when the suction is provided from the suction side of an internal combustion engine which varies considerably according to the acceleration of such engine, then the increased pressure in the chamber 35, or the reducing of the fluid pressure differential tending to be equalized with atmospheric pressure, reduces the compression of the spring 26 and the valve 37 is then opened. The cup is limited in its outward movement by abutting the inner side of the spider bearing 36. Additional air under atmospheric pressure is thus admitted through the valve 37 and nozzle 52 for injection in the form of fluid jet against the rotor blades 19. Thus at lower internal pressures in the casings or reduced fluid pressure differential, two jets of fluid are directed against the blades 19 at substantially diametrically opposite positions of the rotor for increasing its efficiency under these conditions. As soon as the fluid again is exhausted more rapidly from the chamber 35 the increased differential fluid pressure closes the valve 37 and then only one nozzle 50 supplies a fluid jet for operating the rotor.

It is of course to be understood that the nozzle of larger internal diameter than the nozzle 50 or 52 can be employed for creating a greater power under normal conditions of operation. However, the sizes of the nozzles 50 and 52 are not selected for the purpose of obtaining the greatest power possible at maximum fluid pressure differential, but the greater uniform and average power within reasonable limits. This kind of arrangement, therefore, prevents excessively rapid rotation of the rotor at maximum rate of exhaustion of fluid from the chamber 37 and likewise prevents excessively slow rotation of the rotor at minimum rate of fluid exhaustion.

While only two nozzles 50 and 52 are shown, it is apparent that a greater number can be employed in substantially the same manner to provide a more refined graduation of successive applications of jets of fluid to the rotor as the pressure differential decreases from the condition of maximum exhaustion of air from the chamber 35.

Although only the preferred form of the invention has been shown and described in detail, it will be apparent to those skilled in the art that the invention is not so limited but that various changes may be made therein without departing from the spirit of the invention or from the scope of the appended claims.

What is claimed is:

1. A fluid motor comprising a casing, a region of fluid under variable sub-atmospheric pressure communicating with said casing, a rotor journalled in the casing, a partition including a diaphragm carried in the casing, a valve having a connection with the diaphragm, an air supplying nozzle communicating with the atmosphere and disposed in the casing wall at a location spaced from the partition, and a nozzle in the partition normally closed against communication with the atmosphere by said valve, said diaphragm being responsive to changes in pressure in said region of fluid under variable sub-atmospheric pressure to open the valve whereby atmospheric air is directed against the rotor through the second nozzle.

2. A fluid motor comprising a casing, a region of fluid under variable sub-atmospheric pressure communicating with said casing, a rotor journalled in the casing, a partition including a diaphragm dividing the casing into a rotor chamber and a supplemental chamber, a valve having a connection with the diaphragm, said valve communicating between the supplemental chamber and the atmosphere, an air-supplying nozzle communicating with the atmosphere and extending into said rotor chamber to direct atmospheric air against said rotor, and a second nozzle in the partition normally closed against communication with the atmosphere by said valve, and communicating between said chambers, said diaphragm being responsive to changes in pressure in said region of fluid under variable sub-atmospheric pressure to open the valve whereby atmospheric air is admitted to the supplemental chamber and is directed against the rotor through the second nozzle.

3. A fluid motor having a turbine chamber, a rotor journaled in the chamber, a nozzle in communication with a region of fluid pressure establishing fluid pressure differential for directing a jet of fluid against the rotor in rotating the latter, said chamber having a discharge opening, a second nozzle having communication with said region for directing a supplementing second jet of fluid against the rotor in rotating the latter, a valve to control the flow of fluid through the second nozzle, means having communication on its one side with said chamber and on its opposite side with said region and operable by the fluid pressure differential acting thereon to close the valve within predetermined pressure values, and means acting to open the valve against the pressure differential when the latter decreases below a predetermined value.

ERWIN C. HORTON.